(12) United States Patent
Narayanswamy et al.

(10) Patent No.: US 9,654,672 B1
(45) Date of Patent: May 16, 2017

(54) SYNCHRONIZED CAPTURE OF IMAGE AND NON-IMAGE SENSOR DATA

(71) Applicant: Intel Corporation, Santa Clara, CA (US)

(72) Inventors: Ramkumar Narayanswamy, Boulder, CO (US); Sheldon L. Sun, Portland, OR (US); Joseph A. Hook, Pittsburgh, PA (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 14/935,111

(22) Filed: Nov. 6, 2015

(51) Int. Cl.
| H04N 5/225 | (2006.01) |
| H04N 5/06 | (2006.01) |
| H04N 5/247 | (2006.01) |

(52) U.S. Cl.
CPC ............... *H04N 5/06* (2013.01); *H04N 5/247* (2013.01)

(58) Field of Classification Search
CPC .......... H04N 5/225; H04N 5/06; H04N 5/247; H04N 3/15
See application file for complete search history.

(56) References Cited

U.S. PATENT DOCUMENTS

| 2002/0135682 A1 | 9/2002 | Oka et al. |
| 2007/0153090 A1 | 7/2007 | Liow et al. |
| 2014/0085420 A1* | 3/2014 | Shahinian ............... A61B 1/045 348/45 |
| 2014/0267871 A1* | 9/2014 | Baek ..................... H04N 5/2258 348/333.05 |
| 2016/0156950 A1* | 6/2016 | Bangma ............. H04N 21/4263 725/116 |

FOREIGN PATENT DOCUMENTS

| JP | 2010272946 | 12/2010 |
| KR | 1020050041525 | 5/2005 |
| WO | 2007110822 | 10/2007 |

OTHER PUBLICATIONS

Notification of Transmittal of the International Search Report and the Written Opinion of the International Searching Authority for counterpart PCT Application No. PCT/US2016/045189, 14 pages, mailed Nov. 23, 2016.

* cited by examiner

*Primary Examiner* — Tuan Ho
(74) *Attorney, Agent, or Firm* — Blakely, Sokoloff, Taylor & Zafman LLP

(57) ABSTRACT

Synchronized capture of image and non-image sensor data is disclosed. In one embodiment, a device for synchronized capture comprises a synchronization signal generator to generate a synchronization (sync) signal for each of a plurality of heterogeneous capture devices and timestamping logic coupled to the synchronization signal generator to assign timestamp information to each set of data captured by individual capture devices of the plurality of capture devices to indicate when the data was captured, wherein the timestamp information is assigned based on when the sync signal is generated for its corresponding capture device and based on a first delay between when the sync signal is generated for a corresponding capture device and when processing of captured data, by a processing device, has been completed.

22 Claims, 8 Drawing Sheets

C: Capture - Sensor Captures Data
A: Arrival - Data Arrives at Timestamping Logic C: Capture - Sensor Captures Data
A: Arrival - Data Arrives at Timestamping Logic S: Sync Pulse Provided by Timestanding Logic
C: Capture - Sensor Captures Data
A: Arrival - Data Arrives at Timestamping Logic S: Sync Pulse Provided by Timestanding Logic
C: Capture - Sensor Captures Data
A: Arrival - Data Arrives at Timestamping Logic

SYNCHRONIZED CAPTURE OF IMAGE AND NON-IMAGE SENSOR DATA

FIELD OF THE INVENTION

Embodiments of the present invention relate to the field of data capture by data capture devices (e.g., sensors); more particularly, embodiments of the present invention relate to synchronizing data captured by data capture devices using timing information.

BACKGROUND OF THE INVENTION

Currently, the mechanism for synchronized capture from multiple heterogeneous cameras, array of microphones and other sensors (e.g., positional sensors, environmental sensors, etc.) do not exist. In general, all these components are not designed to be synchronized to microsecond level accuracy. Therefore, system designers that desire such synchronization must design and build a system using programmable logic and firmware to implement precision synchronization capabilities.

Certain sensor manufacturers provide synchronization mechanisms for sensors of the same type, but do not provide a complete solution for streaming synchronized video data to an application. For example, image sensors such as Aptina's MT9M114 allow synchronized capture from two or more sensors of the same type by connecting them in a daisy chain manner and triggering capture using one of the sensors as the master. However, this mechanism is limited to the same type of sensor and is typically used in stereoscopic image capture applications. It is also limited to aligned captures, with all sensors imaging simultaneously. It does not allow for deliberately skewed captures. Thus, none of these sensors are designed to operate with other heterogeneous mix of image sensors.

Other sensors expose a general purpose input/output (GPIO) pin or a Frame-Sync pin that can be used to trigger capture on the sensor. But, it is the responsibility of the developer to build a system using this pin to synchronize multiple cameras and aggregate the video streams from each of them.

Today, there are a number of academic papers that describe camera array systems built using specific sensors and hardware and describe high performance imaging using large camera arrays. However, the system design is described for the specific image sensors and their architecture and does not account for modern data streaming interfaces used in mobile devices such as, for example, Mobile Industry Processor Interface (MIPI)/Universal Serial Bus 3.0 (USB3.0), etc. The systems they describe use homogenous image sensors and did not address the case of synchronizing to heterogeneous image sensors or additional sensors such as microphone arrays and positional sensors. Furthermore, they do not address generating timestamps in the presence of intermediate image-signal processing units in the data path.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
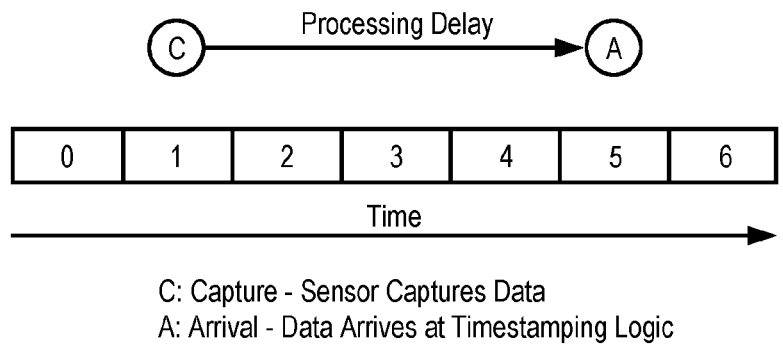
FIG. 1 illustrates characterizing the processing delay using a capture trigger and a start-of-frame indicator.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A system and method for synchronized capture of image data along with non-image data (e.g., a gyroscope or other orientation sensors, accelerometer, compass, microphones, etc.) from a multi-camera imaging system are described. Synchronization-related teachings are described, as well as techniques for synchronizing other sensors and time stamping of a variety of data packages within a specified precision (e.g., 10 microseconds) across all image sensors and 1 millisecond across all non-image sensors.

In one embodiment, the system is an end-to-end system that achieves synchronized capture of image, video, audio and position data from a media capture platform that consists of multiple heterogeneous cameras, an array of one or more microphones and one or more positional sensors.

Synchronized capture of images from multiple cameras makes it possible to capture images of a scene from different perspectives and with different camera parameters. One possible application of this feature is to enable estimation of the depth of different points in any dynamic scene. Depth estimation and multi-perspective imaging make possible a number of applications including size estimation, 3D reconstruction, and post-capture refocusing. Having additional sensor information such as audio streams, gyroscope data, and accelerometer data synchronized with each image frame enables new use cases such as, for example, enhancing the sound from a certain part of the image while suppressing sounds from other parts of the image. For example, imagine a scene with a bird-chirping in the foreground and a dog barking in the background. By applying layer-based effects like refocus to the scene, the corresponding sound from that depth layer can be enhanced or suppressed. However, the fundamental capability to enable such use cases is to aggregate the streaming video streams from each of the cameras in the camera array, the corresponding audio streams from the array of microphones, and assign timestamps to datasets so that corresponding frames from each of the cameras and microphones can be reliably and accurately identified. These aggregated data streams are then sent over standard data interfaces, such as, for example, USB3.0, Peripheral Component Interconnect Express (PCIe) or MIPI, to the processing host, which could be a mobile device (e.g., tablet, smartphone, laptop, etc.), a computer system, a server, etc.

Synchronization of a heterogeneous set of image sensors can be performed in a number of ways depending on configuration supported by the sensor manufacturer. In one embodiment, synchronization is performed by issuing a synchronization (sync) signal for each frame (e.g., each image frame from one or more cameras), which allows synchronization of cameras without relying on precisely matched sensor settings (such as frame rates) to maintain alignment. In one embodiment, individual sync signals are connected to independent imaging sensors, which allows predetermined configurable timing offsets to be applied to individual image sensors.

In one embodiment, the synchronization is quantified using timing information in the form of timestamps. In one embodiment, the timestamp values are recorded from a precision timer at a designated time during sample acquisition. In one embodiment, for image sensors, the timestamp of a frame is based on the time when the Start of Frame indicator is reported by the sensor (camera), which typically occurs after the first row of pixels is captured. Note that CMOS sensor experts will recognize that in an electronic rolling shutter sensor, different rows are exposed at different times, but in one embodiment, for easier meta-tag management, each frame is tagged with a single timestamp. In another embodiment, the timestamp value offsets are calculated for any row, taking into account the exposure window for each row, the row length, the number of columns, frame-rate, row-banking and column blanking times.

For non-image sensors, in one embodiment, the timestamp is based on the time when the sample is acquired by the timestamping logic. For microphones, this corresponds to a single audio sample, 24 bits in one example implementation. For the other sensors, this corresponds to a triplet of values—X, Y, and Z measurements. Since these sensors generate periodic samples, produce less data per sample and have a larger synchronization tolerance than the image sensors, not all timestamps must be recorded. Recording all timestamps increases bandwidth and storage. In one embodiment, one timestamp is recorded per image frame period. In one embodiment, the timestamp chosen is the timestamp of the first sample after start of a frame period. That choice is somewhat arbitrary, but simplified correlation of image data to the other sensor values. For example, for a 10 frame per second image sensor, the timestamps may be 0, 100 ms, 200 ms, etc., and in one embodiment, the other sensors are timestamped once per frame period (10 ms). Alternatively, the 'middle' sample could be timestamped, in which case the timestamps would have been 50 ms, 150 ms, 250 ms. Instead, timestamping the first sample in the frame period, results in timestamps of 0, 100 ms, 200 ms, the same as the image sensor timestamps. The information is the same (with the knowledge of which sample is timestamped, but more convenient to use if the values are aligned. Since the samples are periodic, in one embodiment, the timestamp of any sample is calculated based on the reference timestamp and the number of samples between the sample of interest and the reference sample.

In a system with a discreet image processor between the sensor and the timestamping logic, such as in one example implementation described herein, the timestamping logic does not have direct visibility into the start of frame output from the sensor. In this case, a compensation function has been implemented to correct for the delay between the start of frame event at the sensor output and the corresponding event at the timestamping logic input. In the reference embodiment, this delay is added by the image processor. If the image processor delay is fixed, the subtraction of a constant offset is all that is required. If the image processor delay is not fixed, a more adaptive compensation scheme is used.

A system and method for synchronized capture of image, video, audio and positional data from a range of sources including camera-array, microphone array, gyroscopes, accelerometer, magnetometers, and/or other systems are described. For purposes herein, "synchronized", means that a pre-determined marker (e.g., the start of frame indicator on the imaging sensor) occurs within a certain precision (e.g., a precision of less than 10 microseconds) between cameras and the audio and positional sensor data is correctly aligned with these temporal-fiducial markers. This ensures that in one embodiment each of the cameras captures an image of the scene at the same time instant (e.g., within the specified precision of 10 microseconds) and the corresponding metadata is accurately associated with these image frames.

Timestamp for the Image Data

In one embodiment, an electronic rolling shutter camera consists of an array of pixels with photodiodes, and each pixel of the sensor is thus composed of the photodiode itself, a charge accumulator, a mechanism to reset the charge accumulator, an optional charge amplifier, and an analog-to-digital converter to translate the resulting charge into a digital value. To reduce cost, size, and power, all of the circuitry except the photodiode and charge accumulator is typically shared. This is achieved by processing each row sequentially. Resetting a row effectively begins the exposure time, and converting the charge to a digital value effectively ends the exposure, and thus the term electronic rolling shutter.

A typical 8M-pixel camera running at 30 frames per second has a row readout time (the time between readout of successive rows) of approximately 12 micro-seconds. This allows the shared circuitry to sequentially process data from each row during the allocated frame period. A typical 1080p camera running at 30 frames per second has a row readout time of about 28 micro-seconds. In each case, this results in a capture where the exposure time for the last row of a frame is almost a complete frame time later than the exposure time for the first row of a frame. In one embodiment, in a system with timestamps, the exposure window for any row is calculated using the image timestamp, the row number, and the row readout time of the sensor.

Timestamp for Audio, Positional and Other Sensors

In one embodiment, in a system with image sensors and other non-image sensors, the other sensors map more intuitively to a timestamp model. A sample is a discreet event at a single point or window of time. For example, with respect to a system with one or more microphones, in one embodiment, the microphones operate at 48 kHz, taking a sample once every 20.8 microseconds. With respect to a system with one or more gyroscopes, in one embodiment, the gyroscope operates at 800 Hz, taking a sample every 1.25 ms. With respect to a system with one or more magnetometers, in one embodiment, the magnetometer operates at 100 Hz, taking a sample every 10 milliseconds. With respect to a system with one or more accelerometers, in one embodiment, the accelerometer operates at 1600 Hz, taking a sample every 625 microseconds. In such a system, with all these type of sensors (or some subset of these sensors), all these media are assigned precise timestamps, and they can be reassembled and associated with the corresponding image-frame correctly by the software (or hardware) and applications using the timestamps.

Characterizing the Time Stamp in the Presence of Intermediate Blocks

For image sensors with a sync pulse input, there is an associated latency between the presentation of the sync pulse and the image capture sequence. In one embodiment, the first operation in capturing images synchronously is to compensate for any differences in this latency. Differences in latency can either be measured or characterized, and then compensated for.

If the timestamping logic has direct visibility into the Start of Frame indicator from the sensor, the next step is to use that indicator to record a timestamp. If another element with processing latency (e.g., a latency associated with processing of captured data prior to the data being received for timestamping by the timestamping logic) is added between the image sensor and the timestamping logic, an additional operation is required. FIG. 1 illustrates characterizing the processing delay using a capture trigger and a start-of-frame indicator. Referring to FIG. 1, a sensor captures data at capture event C and indicates this by transmitting a start of frame indicator. This event is not communicated to the time-stamping logic until sometime later, at arrival event A. This is due to processing delay 101. In this case, the timestamping logic takes the current time when event A occurred and subtracts 4 in this example to calculate the desired timestamp of when capture event C occurred.

This relationship is true for all sensors that perform post-capture data (e.g., image) processing prior to time-stamping, but in one embodiment, only the image sensors have an additional delay component (e.g., a processing delay component) between data acquisition and presentation of the data to the timestamp logic.

Figure 2:
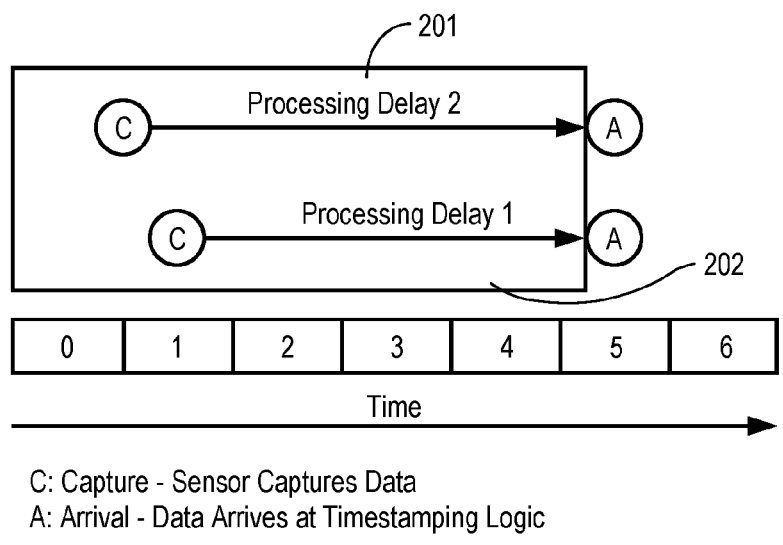
FIG. 2 illustrates examples of when two different sensors have different processing delays associated with them.

While FIG. 1 simplifies the scenario by directly providing all of the information needed to perform the calculation, other scenarios are more complicated. For example, in one embodiment, the system includes image sensors and image processing elements and is complicated by a pair of factors. First, the time when capture event C occurs is not known to the timestamping logic. FIG. 2 illustrates examples of when two different sensors have different processing delays associated with them. This may occur, for example, where the captured data from one of the image sensors undergoes JPEG conversion while the captured data from the other image sensor does not undergo JPEG conversion.

Referring to FIG. 2, capture event C occurs at time 1 and time 2. Second, the processing delay introduced by the image processor associated with each image sensor is not fixed. The processing delay may be constant for a given image processing configuration, but changes based on the image processing stems enabled. For example, the processing delay is longer when the image processor is converting the image format to the Joint Photographic Experts Group (JPEG) standard than when it is preserving the input format. The timestamping logic is only aware of event A, and cannot distinguish between the two example processing delays 201 and 202 without additional information.

Figure 3:
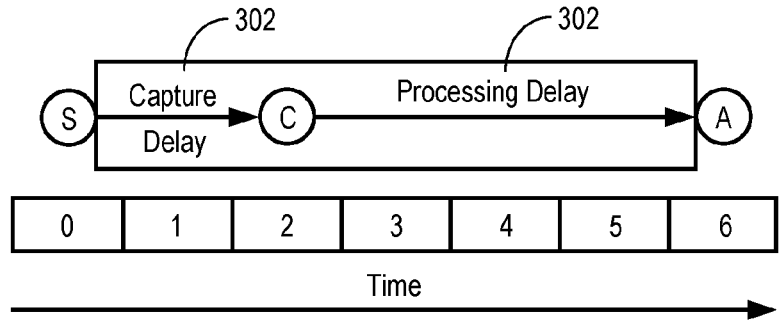
FIG. 3 illustrates one embodiment of the relationship between a sync pulse, a capture event, a processing delay using a capture trigger, and arrival of the data at the timestamping logic.

In one embodiment, additional information is available, in the form of the synchronization pulse provided by the timestamping logic. FIG. 3 illustrates one embodiment of the relationship between a sync pulse, a capture event, a processing delay using a capture trigger, and arrival of the data at the timestamping logic. Referring to FIG. 3, a sync event S and arrival event A available to the timestamping unit are shown, where S is the sync pulse provided to the capture device and the timestamping logic and A is when data arrives to the timestamping logic. Also shown is capture event C, which is hidden to the timestamping logic. This is still not enough information for the timestamping logic to be able to perform the compensation, but if capture delay 301 is known, either by specification or characterization, the timestamping logic can calculate processing delay 302. Since the timestamping logic is aware of events S and A, the time stamping logic calculates the duration of processing delay 302 and thus the timing of event C by simple arithmetic. In one embodiment, this calculation is done automatically by firmware when software performs a configuration operation that may alter the processing delay.

Figure 4:
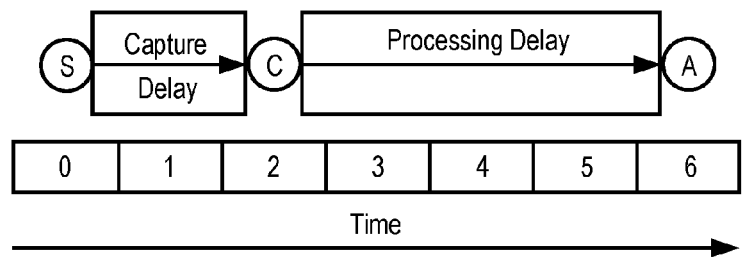
FIG. 4 illustrates a determination of the capture delay either by specification or characterization.

FIG. 4 illustrates the full calculation once the capture delay is determined either by specification or characterization. By having the capture delay prior to timestamping the captured data, a determination can be made as to when a data capture event occurred by the capture device when the time of its sync pulse and data arrival time at the timestamping logic are known.

Note that this compensation to an absolute time scale is an improvement over prior art techniques in which the difference in processing delays across sensors was compensated for, but not the entire delay. For example, if one sensor had a delay of 100 microseconds and another sensor had a delay of 150 microseconds, the second sensor was compensated by subtracting 50 microseconds. Since the time scale was only a relative time scale, and no other sensors were part of the system, this was sufficient. Conversion to an absolute time scale necessitated a complete compensation, and facilitated the addition of other sensors.

An Example Timestamping System and Device

Figure 5:
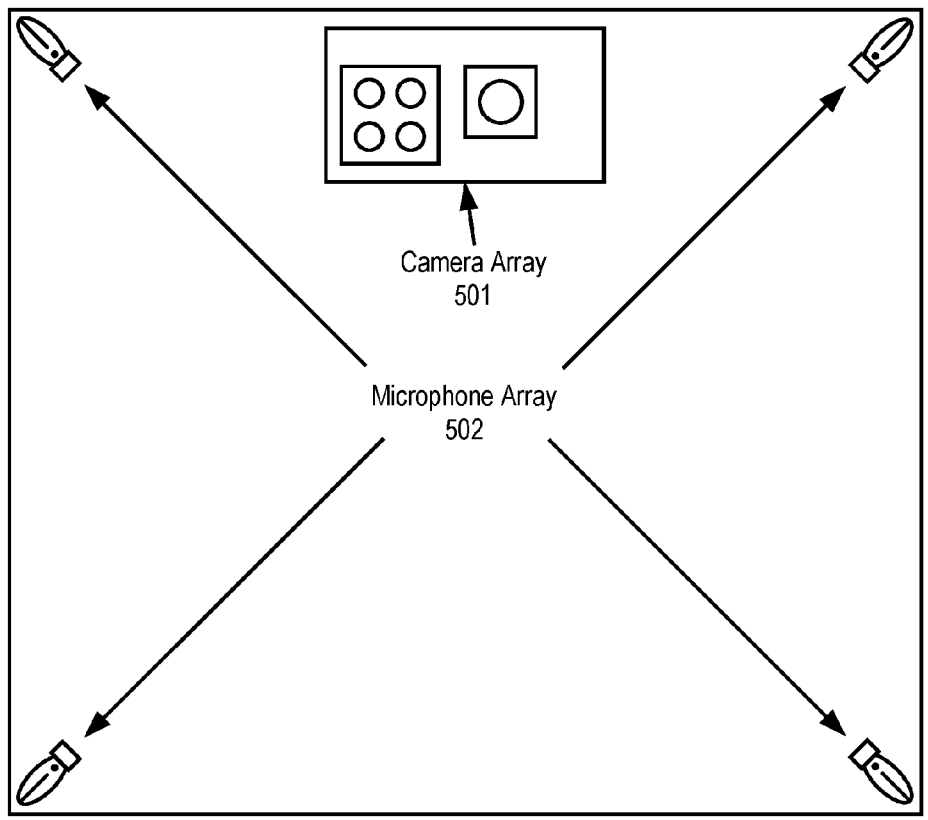
FIG. 5 illustrates one embodiment of a camera system.

FIG. 5 illustrates one embodiment of a camera system. Referring to FIG. 5, a camera array 501 includes a plurality of cameras. In one embodiment, camera array 501 includes a 4×1080p camera and 1×8 Mpix camera. Note that camera array 501 can include more than or less than 5 cameras and may include other types of cameras instead of or in addition to the 1080p camera and the 8 Mpix camera. The camera system of FIG. 5 also includes four microphones 502 and other inertial measurement sensors (not shown). In one embodiment, microphones 502 and the other inertial measurement sensors are all synchronized and time-stamped to enable a range of applications. These applications include, but are not limited to, depth and layer-effects. In one embodiment, the camera system is includes in a mobile device (e.g., phone, tablet, etc.).

Figure 6A:
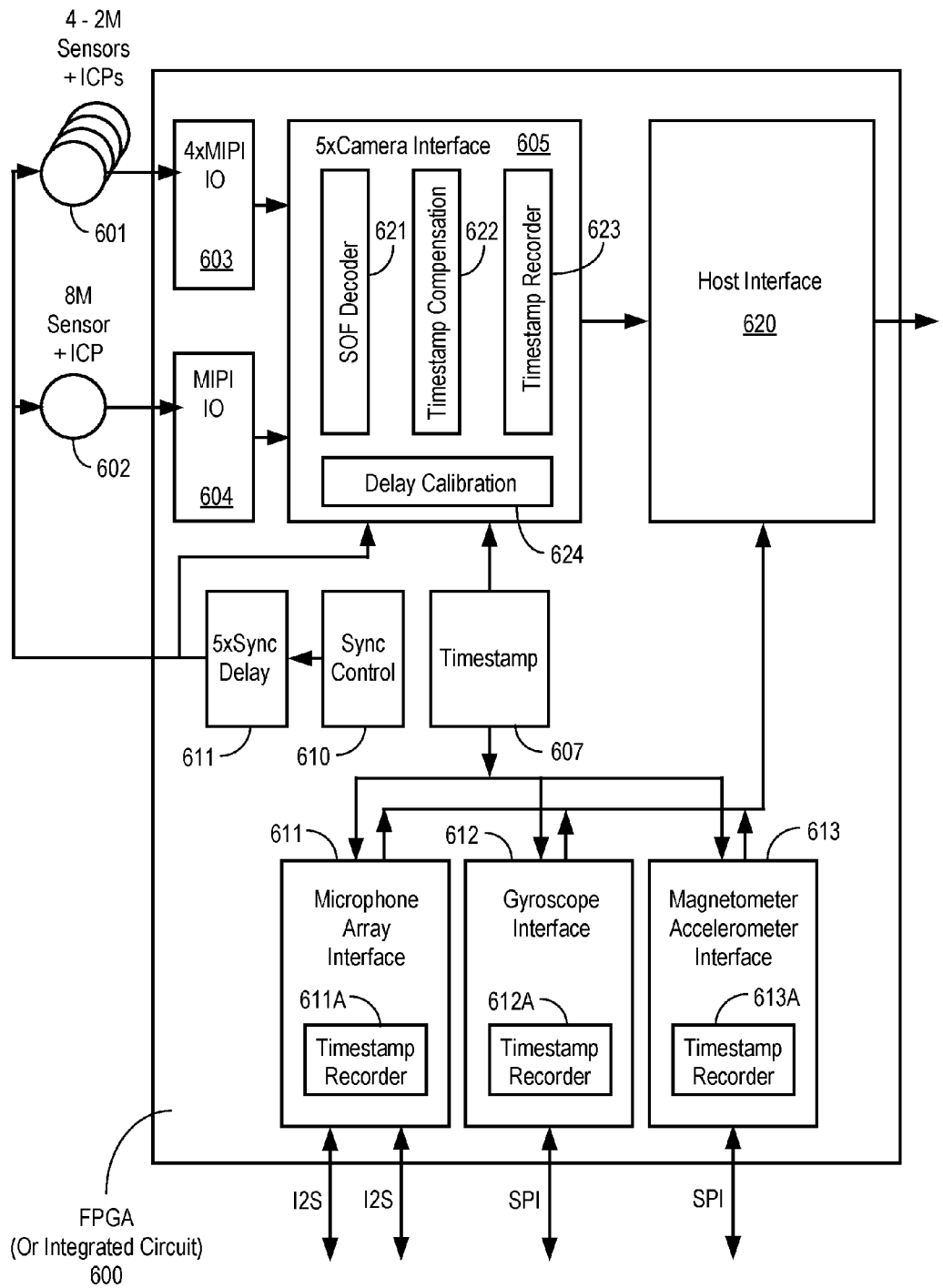
FIG. 6A is a block diagram of one embodiment of a multi-camera, multi-sensor system.

In one embodiment, the system obtains synchronized video data captured from an array of multiple, heterogeneous cameras. FIG. 6A is a block diagram of one embodiment of a multi-camera, multi-sensor system.

Referring to FIG. 6A, camera and image processors are connected serially via a MIPI interface. Specifically, there are 4 1080p cameras 601 and one 8 Mpix camera 602. In one embodiment, each of cameras 601 and 602 includes an image processing unit (e.g., Image CoProcessor (ICP)) associated with it. In one embodiment, the each cameras and its image processing unit are in separate modules; in another embodiment, they are in the same module.

The output of each of the image processing unit is terminated into a field-programmable gate array (FPGA) 600 (or integrated circuit (IC) device) that functions as the master synchronization handler for all data stream. More specifically, the outputs of the image processing units associated with cameras 601 are connected to input/output (I/O) interfaces 603 of FFPGA 600. In one embodiment, interfaces 603 are Mobile Industry Processor Interface (MIPI) I/O interfaces that in one embodiment convert the data from one I/O protocol to a digital/pixel based interface. The output of the image processing units associated with camera 602 are input to input/output (I/O) interfaces 604. The outputs from I/O interfaces 603 and 604 are coupled to camera interfaces 605. In one embodiment, there is one camera interface for each of cameras 601 and 602.

FPGA 600 generates synchronization triggers that are sent to all camera modules in the system that require such a trigger. In one embodiment, the synchronization pulses can be programmed to trigger all cameras at the appropriate times to capture images simultaneously or with a configurable skew. The synchronization (sync) pulses are output from 5×Sync delay 611 under control of sync control 610. In one embodiment, the sync pulses are also sent to camera interface 605 for use in performing timestamp compensation.

FPGA 600 is also responsible for being a data aggregator that collects all synchronized image data and non-image sensor data and applies a timestamp to the data from the sensors. FPGA 600 includes camera interfaces 605 that apply (tag) the captured and processed data received from image sensors (cameras) and image processing units. In one embodiment, each of camera interfaces 605 comprises a Start-of-Frame decoder 621, a timestamp compensation unit 622, a timestamp recorder 623, and a delay calibration unit 624. Start-of-Frame decoder 621 determines the start of frame associated with the captured and processed incoming data that is received from the I/O interfaces 603 and 604. Timestamp compensation unit 622 performs timestamp compensation to adjust a timestamp received from timestamp generator 607 based on delay information from delay calibration unit 624. Delay calibration unit 624 uses the sync signals generated by sync control 610 and sync delays 611 and the capture delay associated with the camera to determine the overall delay between the time the captured data was received by camera interface 605 and when the data was actually captured by the camera. Delay calibration unit 624 provides the delay amount to timestamp compensation unit 622, which adjusts the timestamp value (e.g., reduces the timestamp value to the time when the data was captured) and provides the updated timestamp value to timestamp recorder 623, which tags the data with the updated timestamp value.

In one embodiment, FPGA 600 includes a number of sensor interfaces for non-image sensors. Specifically, microphone array interface(s) 611 provides an interface for audio data captured by microphones. In one embodiment, data is read from the microphones over I2S (an Inter-IC Sound interface)—a serial interface in which a sample is read from the device every sample period. The interface itself adds some amount of latency due to its serial nature, but several 20.8 microsecond sample periods would still be small compared to the desired accuracy of 1 millisecond. Gyroscope array interface(s) 612 provides an interface for gyroscope data captured by a gyroscope. Magnetometer/accelerometer interface(s) 613 provides an interface for data captured by magnetometers or accelerators. In one embodiment, these other sensors communicate over a polling Serial Peripheral Interface (SPI) interface, and the sensor devices are continually polled until a sample is available. The SPI interface also introduces a small amount of latency between when a sample is recorded and when it is read. This latency is also small—approximately 20 microseconds worst case—compared to the desired accuracy of 1 millisecond.

Each of the non-image sensor interfaces includes a timestamp recorder to tag data from the non-image sensors with timestamps that are received from timestamp generator 607. That is, microphone array interface(s) 611 includes timestamp recorder 611A to tag audio data captured by microphones with a timestamp from timestamp generator 607. Gyroscope array interface(s) 612 includes timestamp recorder 612A to tag gyroscope data captured by a gyroscope with a timestamp from timestamp generator 607. Magnetometer/accelerometer interface(s) 613 includes timestamp recorder 613A to tag data captured by magnetometers or accelerators with a timestamp from timestamp generator 607.

Once all data (image and non-image) is time-stamped, host interface 620 prepares the data for transmission to a host computing device. That is, the tagged data from image sensors from camera interfaces 605 and from non-image sensors are sent to host interface 620 for transmission to host computing device. Host interface 620 aggregates and stores sensor data until it can be sent to the host. At that time, host interface 620 packages the data into a suitable format for transmission. In one embodiment, the formatting of the data is optimized to any of the host interfaces to the FPGA (e.g., MIPI, Peripheral Component Interconnect Express (PCIe), universal serial bus (USB), etc.).

Figure 6B:
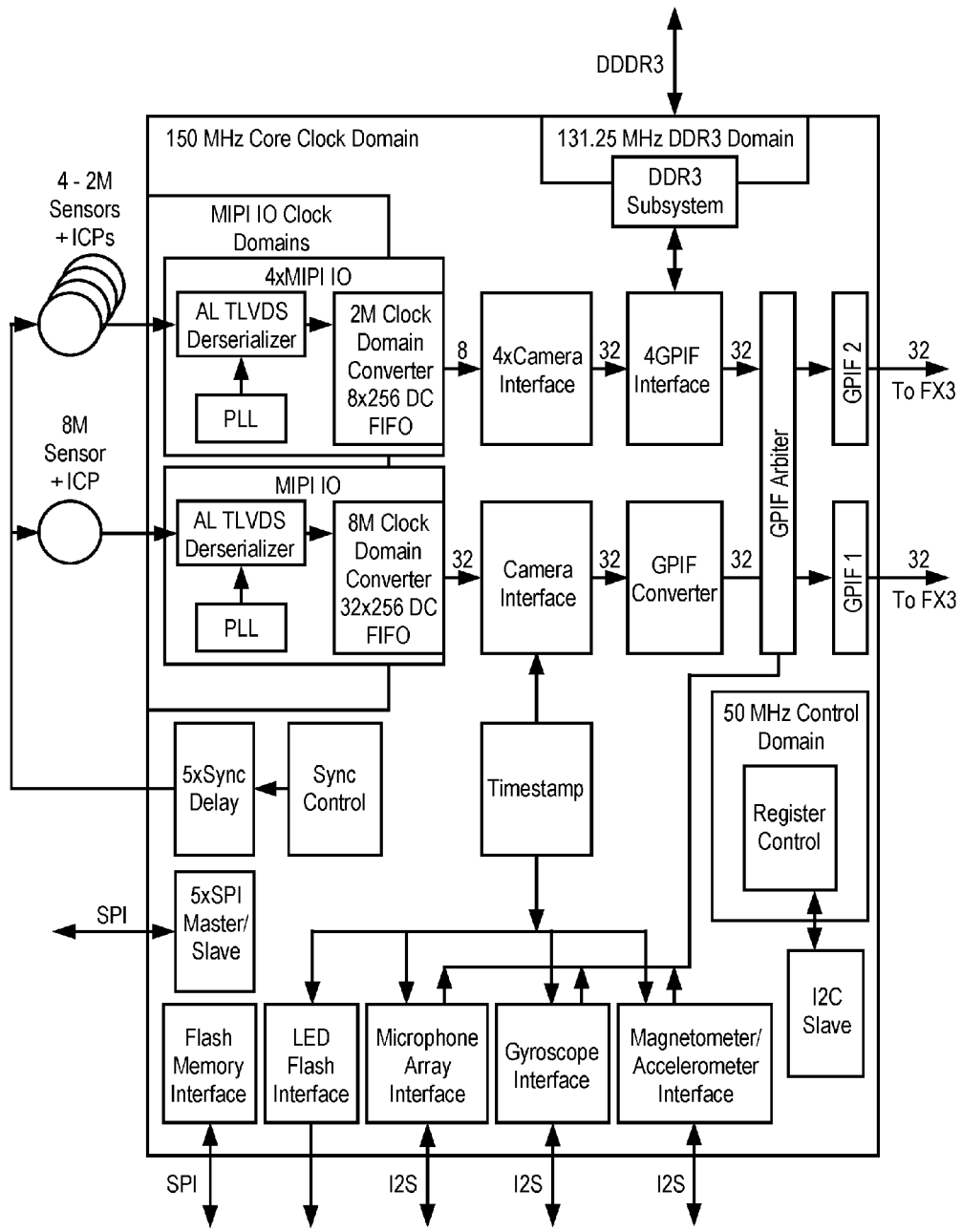
FIG. 6B is a block diagram of a more detailed embodiment of a multi-camera, multi-sensor system.

FIG. 6B is a block diagram of a more detailed embodiment of a multi-camera, multi-sensor system. One skilled in the art would recognize and understand the operation of the components that are include in FIG. 6B, but have been omitted or not shown explicitly in FIG. 6A.

While the multi-camera, multi-sensor system, including the generation of the sync pulses, triggering of cameras and timestamping described herein, is shown implemented with an FPGA or IC, in other embodiments, the system is implemented with an integrated unit (e.g., system-on-a-chip (SoC) that is used in a mobile device (e.g., mobile or smart phone, iPad, tablet, laptop, etc.)). The synchronized video streaming data from such a mobile device enables a number of 3D and computational photography applications.

As set forth above, in one embodiment, the synchronization control 610 generates a waveform (e.g., software customizable waveform (period and duty cycle)) that is used for the sync pulse. In one embodiment, the waveform is customizable and is used as the master sync pulse. Each sync pulse sent to a camera module used for image capture is based on the master sync pulse and can be delayed so that the image capture event can be skewed as desired. The skew may be different for different camera modules to coordinate their capture. In one embodiment, the skews of multiple cameras are set based on their different capture delays so that the cameras capture data at the same time. Thus, in a system with multiple synchronized cameras, multiple delay elements may be employed to control the amount of delay for each camera's operation. In another embodiment, the sync pulses are skewed for different cameras so that the camera capture data at different times (e.g., each camera operating at a different capture time). This may be used to capture a sequence of images.

In one embodiment, the delay to each camera is configured via software accessible registers. Alternatively, the delay to each camera could be hardcoded or configured via hardware.

Figure 7:
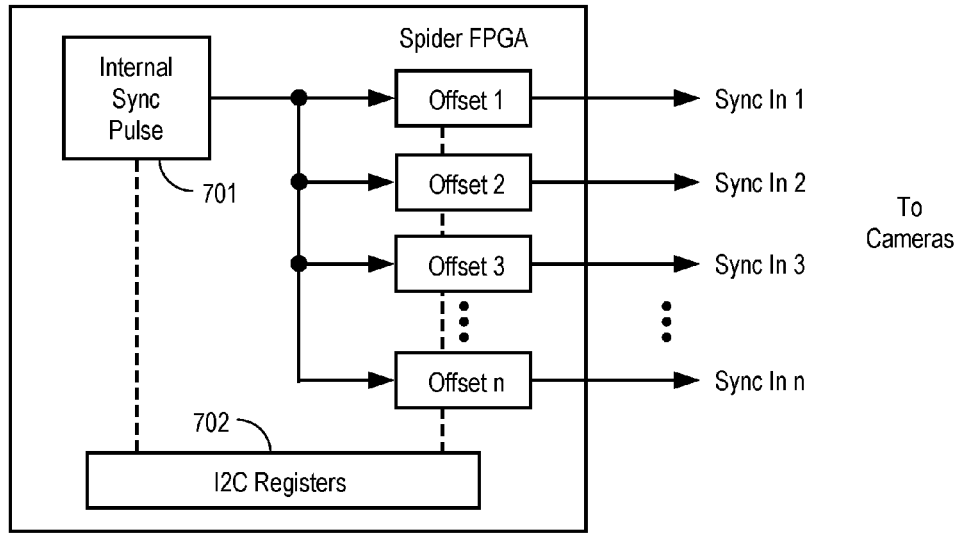
FIG. 7 is a block diagram of one embodiment of a sync pulse generation mechanism.

FIG. 7 illustrates a block diagram of a sync pulse generation mechanism. In one embodiment, the sync pulse generation mechanism has the capability to offset the various cameras in a system. The mechanism may be the system that includes the integrated circuit of FIG. 6A.

Referring to FIG. 7, the sync pulse generation mechanism comprises an internal sync pulse generator 701 that generates a sync pulse. In one embodiment, the sync pulse output from sync pulse generator 701 is input into n offsets. Each of the offsets varies the timing of the sync pulse to produce a sync pulse that may be offset with respect to the original sync pulse from internal sync pulse generator 701. The offsets may be the same or different from each other, and some offsets may be zero (no offset). The amount of offset is controlled. In one embodiment, the amount of offset is controlled based on programming. The programming may be performed to program a register (e.g., 12C register 702) that includes one or more bits associated with each offset to cause the offset to modify the timing of the sync pulse from internal sync pulse generator 701. In one embodiment, the programmed offset value is selected based on the desired timing for a camera capture and/or the associated capture delay of the camera.

An Example of Timestamp Generation

In one embodiment, the timestamps are 64-bit in length, though timestamps of any length may be used. In one embodiment, the 64-bit timestamp generation for the entire system is generated from a single clock source that is programmed to match the host computing device's time. All sensor data (image and non-image sensor) are time-stamped from this timing mechanism. In one embodiment, timestamps tagged on to data can be used to align all data to a specific time. Image data is time-stamped at the end of integration of the first line, which corresponds with its indication of the start of frame. Timestamping is independent of operational mode. In one embodiment, non-image sensors are time-stamped once per frame period. Timestamps of the image and non-image data can be exacted and compared so that non-image data can be synchronized with image data.

Figure 8:
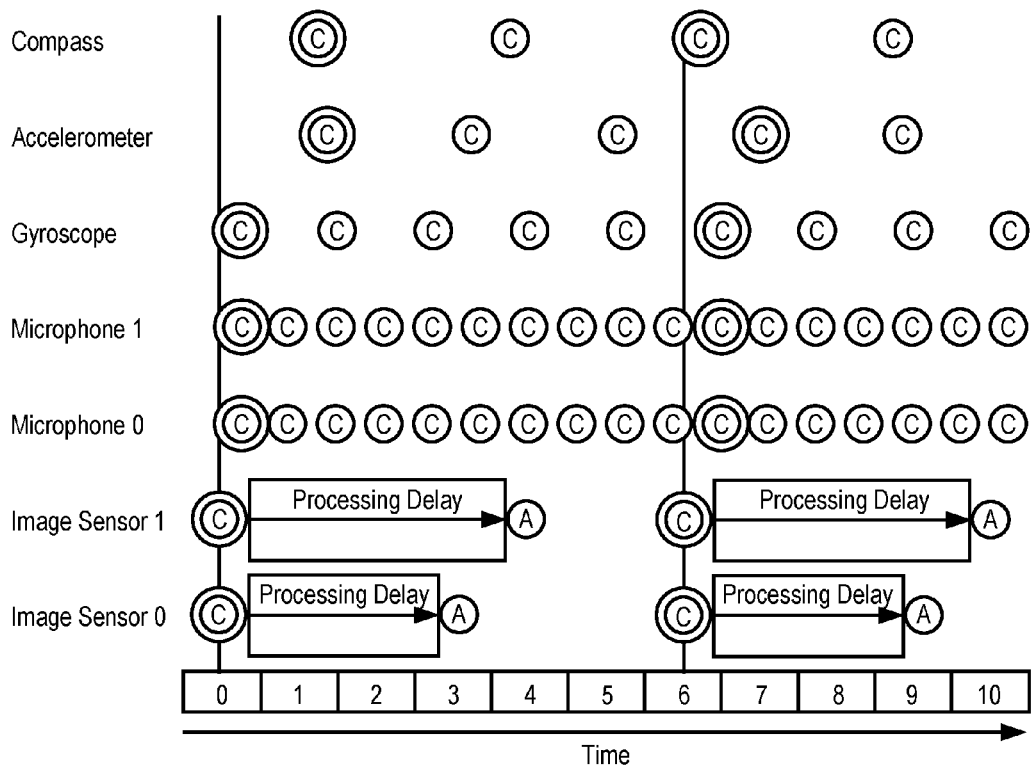
FIG. 8 illustrates one embodiment of a time stamping system in a multi-camera and multi-sensor system.

FIG. 8 illustrates one embodiment of a timestamping system. In one embodiment, a common timer is used to generate timestamps for all data sources. Referring to FIG. 8, a timestamp is recorded for every capture event C as indicated by the ring around them. The first sample in a frame period, which are marked by the vertical lines at times 0 and 6, is time-stamped and the time of all other samples is calculated based upon this timestamp and the sample period. Image sensors 0 and 1 are shown with their respective processing delays and arrival event A.

Non-image sensors are shown with multiple capture events per frame period. In one embodiment, the non-image sensors do not need to be sampled any specific number of times per frame period, which allows the use of sensors with their own internal oscillators that are not frequency locked to the rest of the system. Because the non-image sensors are not capturing data based on the frame period, they may capture different numbers of samples each frame period based on how often their capture operation is performed.

Note that the process shown in FIG. 8 repeats every frame period and the transfers of data from the sensors are based on the frame period.

Figure 9:
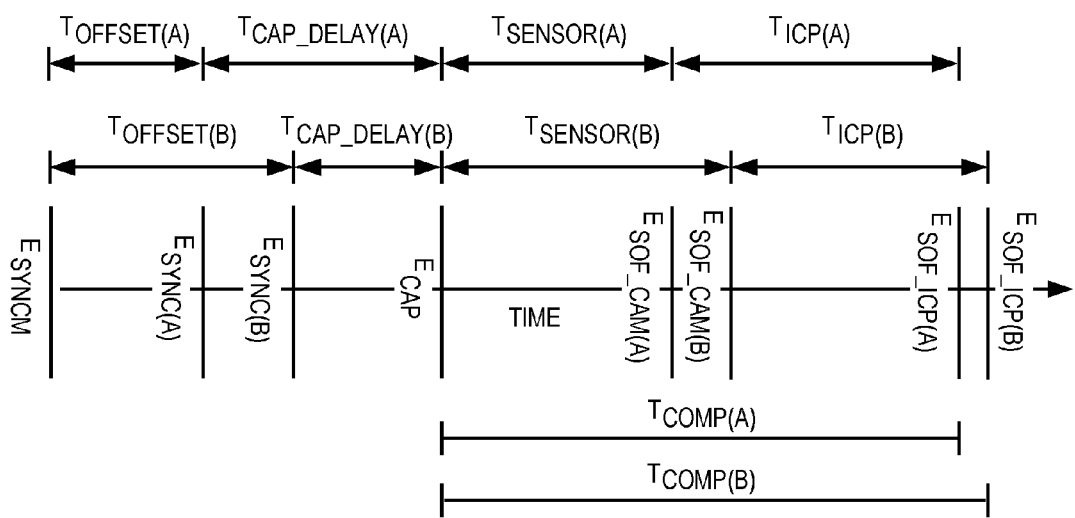
FIG. 9 is a timing diagram illustrating the timing delays for which timestamp compensation is performed in one embodiment to synchronize capture by multiple data capture devices.

FIG. 9 is a timing diagram illustrating the timing delays for which timestamp compensation is performed in one embodiment to synchronize capture by multiple data capture devices. In this example, there are two capture devices.

The following key is used in FIG. 9:
Events:
$E_{CAP}$—The Capture Event
$E_{SYNC(A)}$—Sync pulse sent to Camera A
$E_{SYNC(B)}$—Sync pulse sent to Camera B
$E_{SYNCM}$—Master sync pulse
$E_{SOF\_CAM(A)}$—Camera A transmits SOF packet on MIPI
$E_{SOF\_CAM(B)}$—Camera B transmits SOF packet on MIPI
$ES_{OF\_ICP(A)}$—ICP A transmits SOF packet on MIPI
$E_{SOF\_ICP(B)}$—ICP B transmits SOF packet on MIPI
Times:
$T_{OFFSET(A)}$—Sync Pulse Delay Offset for Camera A
$T_{OFFSET(B)}$—Sync Pulse Delay Offset for Camera B
$T_{CAP\_DELAY(A)}$—Camera A Sync Pulse to Image Capture
$T_{CAP\_DELAY(B)}$—Camera B Sync Pulse to Image Capture
$T_{SENSOR(A)}$—Camera A Image Capture to SOF packet on MIPI
$T_{SENSOR(B)}$—Camera B Image Capture to SOF packet on MIPI
$T_{ICP(A)}$—ICP A SOF received to SOF transmitted
$T_{ICP(B)}$—ICP B SOF received to SOF transmitted
$T_{COMP(A)}$—Timestamp compensation for Camera A
$T_{COMP(B)}$—Timestamp compensation for Camera B In one embodiment, the desired goal of the system is synchronous image capture, as indicated by $E_{CAP}$. For two image sensors, camera A and camera B, to perform such a synchronous capture, they need to receive their respective synchronization triggers ($E_{SYNC}$) at the correct relationship, taking into account the different capture delays for the two image sensors. This is achieved by skewing individual sync pulses by individual offsets ($T_{OFFSET}$) from a master synchronization waveform. As shown, the $T_{OFFSET}$ of camera A is shorter than the $T_{OFFSET}$ of camera B because the capture delay of camera A is longer than that capture delay of camera B. In one embodiment, the size of the offsets can be calculated as $T_{OFFSET(N)}=T_{CAP\_DELAY(MAX)}-T_{CAP\_DELAY(N)}$.

Once the capture is synchronized, the timestamps are generated, compensating for any delays added by the system between the sensor and the timestamping logic. Generally speaking, there can be any number of delay factors. In FIG. 9, two delay factors are indicated which include the delay between the time of image capture by a camera to the SOF packet is transmitted by the camera on the MIPI and the delay between the time the SOF indication is received by the image processing element and its transmitted (to the timestamping logic). In other example implementations discussed herein, only a single delay factor, the latency of the image processing component, is included.

Figure 11:
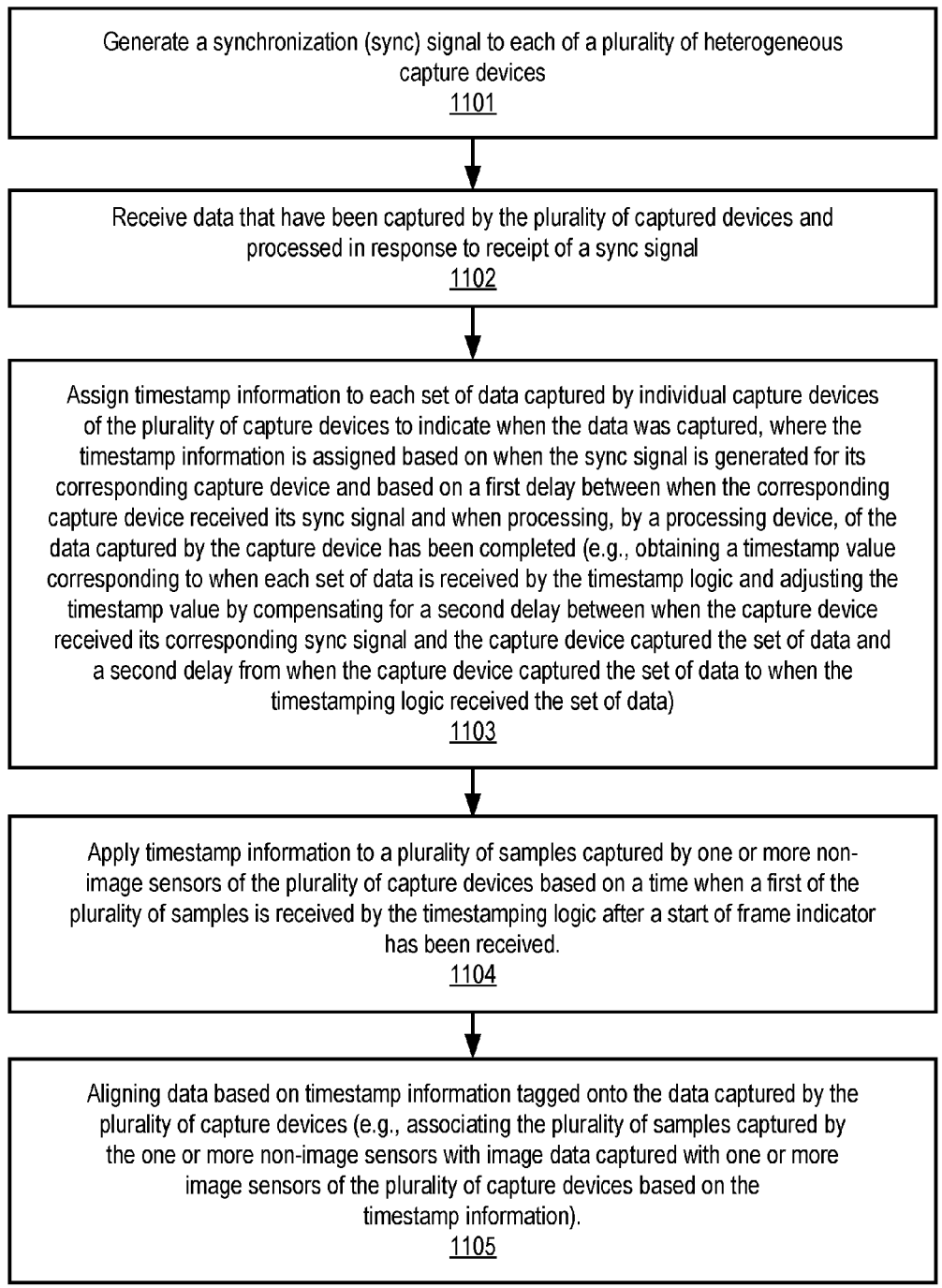
FIG. 11 is a flow diagram of one embodiment of a process for synchronizing multiple capture devices.

FIG. 11 is a flow diagram of one embodiment of a process for synchronizing multiple capture devices. The process is performed by processing logic that may comprise hardware (circuitry, dedicated logic, etc.), software (such as is run on a general purpose computer system or a dedicated machine), firmware, or a combination of these three.

Referring to FIG. 11, the process begins generating a synchronization (sync) signal to each of a plurality of heterogeneous capture devices (e.g., image sensor devices) (processing block 1101). Subsequently, processing logic receives data that have been captured by the capture devices and processed in response to receipt of a sync signal (processing block 1102).

After receiving the data, processing logic assigns and tags timestamp information (e.g., timestamp values) to each set of data captured by individual capture devices to indicate when the data was captured (processing block 1103). In one embodiment, the timestamp information is assigned based on when the sync signal is generated for its corresponding capture device and based on a delay between when the corresponding capture device received its sync signal and when processing, by a processing device, of the data captured by the capture device has been completed. In another embodiment, the timestamp information is assigned by obtaining a timestamp value corresponding to when each set of data is received by the timestamp logic and adjusting the timestamp value by compensating for one delay between when the capture device received its corresponding sync signal and the capture device captured the set of data and a another delay from when the capture device captured the set of data to when the timestamping logic received the set of data.

In one embodiment, processing logic applies, or tags, the timestamp information to a plurality of samples captured by one or more non-image sensors of the plurality of capture devices based on a time when a first of the plurality of samples is received by the timestamping logic after a start of frame indicator has been received (processing block 1104).

After the captured data has been tagged with timestamp information, processing logic aligns data based on timestamp information tagged onto the data captured by the plurality of capture devices (processing block 1105). In one embodiment, the aligning process associates the plurality of samples captured by the one or more non-image sensors with image data captured with one or more image sensors of the plurality of capture devices based on the timestamp information.

Today no mechanism exists to tightly synchronize image data with non-image data. The timestamping infrastructure described herein is advantageous as it allows timestamping of all data with a common timestamping mechanism. Since the timestamps originate from the same place, all data can be collected and aligned. Furthermore, the timestamps can be compared either at a hardware or software level.

Figure 10:
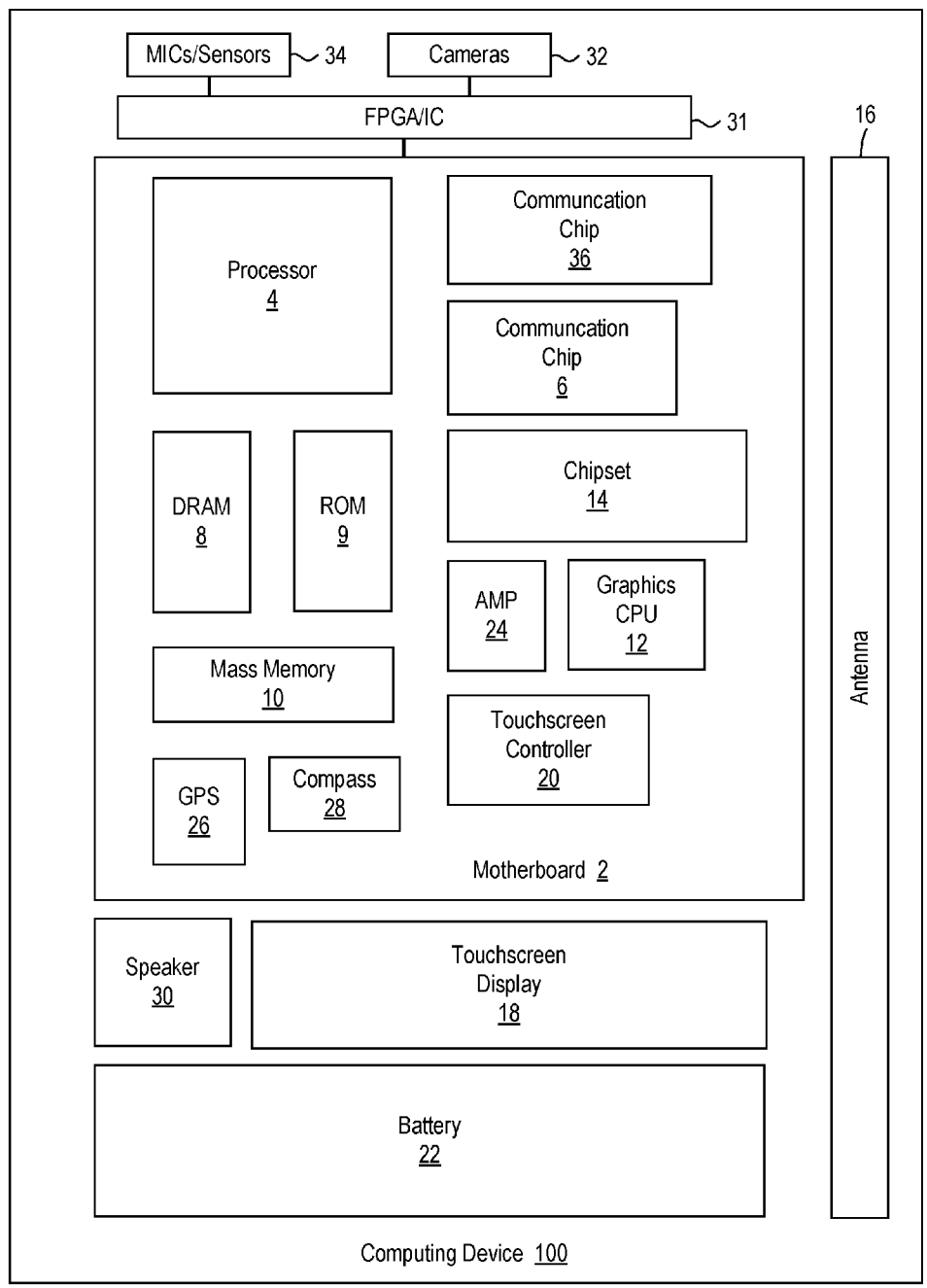
FIG. 10 is a block diagram of one embodiment of a portable image capture device.

FIG. 10 illustrates a portable image capture device 100 in accordance with one implementation. The imaging device 100 houses a system board 2. The board 2 may include a number of components, including but not limited to a camera array 32 as described above, a processor 4, and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone (or other sensor) array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

In one embodiment, camera array 32 and microphone/sensor array 34 are coupled to image processing chip 36 (e.g., an imaging signal processor) and/or to the processor 4, either directly or through the image chip, via FGPA/IC 31, which is described above. The image chip may take a variety of different forms, such as a graphics coprocessor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras of camera array 32 may include all of the components of the camera or share resources, such as memory 8, 9, 10, processing 4 and user interface 12, 20, with other video device components and functions. The processor 4 is coupled to camera array 32 and to memory to receive frames and produce enhanced images. In one embodiment, cameras of camera array 32 include an image capture sensor(s) and color filter array described above. In one embodiment, cameras of camera array 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

In a first example embodiment, a device comprises a synchronization signal generator to generate a synchronization (sync) signal for each of a plurality of heterogeneous capture devices; and timestamping logic coupled to the synchronization signal generator to assign timestamp information to each set of data captured by individual capture devices of the plurality of capture devices to indicate when the data was captured, wherein the timestamp information is assigned based on when the sync signal is generated for its corresponding capture device and based on a first delay between when the sync signal is generated for a corresponding capture device and when processing of captured data, by a processing device, has been completed.

In another example embodiment, the subject matter of the first example embodiment can optionally include that the first delay comprises a second delay between when the captured device received the sync signal and when the capture device captured its corresponding data and a third delay between when the captured device captured its corresponding data and when processing of that captured data was completed.

In another example embodiment, the subject matter of the first example embodiment can optionally include that the timestamping logic is operable to assign timestamp information to each set of data by obtaining a timestamp value corresponding to when said each set of data is received by the timestamp logic and adjusting the timestamp value by compensating for a second delay between when the capture device received its corresponding sync signal and the capture device captured the set of data and a second delay from when the capture device captured the set of data to when the data is received for tagging with timestamp information by the timestamping logic.

In another example embodiment, the subject matter of the first example embodiment can optionally include that the timestamping logic is operable to assign the timestamp information by assigning the timestamp information to a frame based on when a start of frame indicator is reported by one of the plurality of capture devices.

In another example embodiment, the subject matter of the first example embodiment can optionally include that the plurality of capture device comprises a plurality of image sensors.

In another example embodiment, the subject matter of the first example embodiment can optionally include that the timestamping logic is operable to apply timestamp information to a plurality of samples captured by one or more non-image sensors of the plurality of capture devices based on a time when a first of the plurality of samples is received by the timestamping logic after a start of frame indicator has been received. In another example embodiment, the subject matter of the last example embodiment can optionally include that the plurality of samples captured by the one or more non-image sensors are aligned with image data captured with one or more image sensors of the plurality of capture devices based on the timestamp information.

In another example embodiment, the subject matter of the first example embodiment can optionally include that the sync signal generator is operable to generate a pair of sync signals for two of the plurality devices having different capture delays, the two sync signals being sent at different times to trigger image capture by the two capture devices at the same time.

In another example embodiment, the subject matter of the first example embodiment can optionally include that the sync signal comprises a sync pulse that is based on a master sync pulse. In another example embodiment, the subject matter of the last example embodiment can optionally include that at least one sync pulse being generated is delay-able to control skew between capture events of at least two of the plurality of capture devices.

In a second example embodiment, a method comprising: generating a synchronization (sync) signal to each of a plurality of heterogeneous capture devices; receiving data that have been captured by the plurality of capture devices and processed in response to receipt of a sync signal; and assigning, by timestamping logic, timestamp information to each set of data captured by individual capture devices of the plurality of capture devices to indicate when the data was captured, wherein the timestamp information is assigned based on when the sync signal is generated for its corresponding capture device and based on a first delay between when the corresponding capture device received its sync signal and when processing, by a processing device, of the data captured by the capture device has been completed.

In another example embodiment, the subject matter of the second example embodiment can optionally include that the first delay comprises a second delay between when the captured device received the sync signal and when the capture device captured its corresponding set of data and a third delay between when the captured device captured its corresponding set of data and when processing of that set of captured data was completed.

In another example embodiment, the subject matter of the second example embodiment can optionally include that assigning timestamp information to each set of data comprises: obtaining a timestamp value corresponding to when said each set of data is received by the timestamp logic; and adjusting the timestamp value by compensating for a second delay between when the capture device received its corresponding sync signal and the capture device captured the set of data and a second delay from when the capture device captured the set of data to when the timestamping logic received the set of data.

In another example embodiment, the subject matter of the second example embodiment can optionally include that assigning the timestamp information comprises assigning the timestamp information to a frame based on when a start of frame indicator is reported by one of the plurality of capture devices.

In another example embodiment, the subject matter of the second example embodiment can optionally include that the plurality of capture device comprises a plurality of image sensors.

In another example embodiment, the subject matter of the second example embodiment can optionally include applying timestamp information to a plurality of samples captured by one or more non-image sensors of the plurality of capture devices based on a time when a first of the plurality of samples is received by the timestamping logic after a start of frame indicator has been received. In another example embodiment, the subject matter of the last example embodiment can optionally include associating the plurality of samples captured by the one or more non-image sensors with image data captured with one or more image sensors of the plurality of capture devices based on the timestamp information.

In another example embodiment, the subject matter of the second example embodiment can optionally include that generating a sync signal to each of the plurality of capture devices comprises generating a pair of sync signals for two of the plurality devices having different capture delays, the two sync signals being sent at different times to trigger image capture by the two capture devices at the same time.

In another example embodiment, the subject matter of the second example embodiment can optionally include aligning data based on timestamp information tagged onto the data captured by the plurality of capture devices.

In a third example embodiment, a system comprises: a plurality of heterogeneous capture devices; a synchronization signal generator to generate a synchronization (sync) signal for each of the plurality of heterogeneous capture devices; timestamping logic coupled to the synchronization signal generator to assign timestamp information to each set of data captured by individual capture devices of the plurality of capture devices to indicate when the data was captured, wherein the timestamp information is assigned based on when the sync signal is generated for its corresponding capture device and based on a first delay between when the sync signal is generated for a corresponding capture device and when processing of captured data, by a processing device, has been completed; and a processing device to receive data with timestamp information captured from at least two of the plurality of capture devices and to align the data based on the timestamp information.

In another example embodiment, the subject matter of the third example embodiment can optionally include that the first delay comprises a second delay between when the captured device received the sync signal and when the capture device captured its corresponding data and a third delay between when the captured device captured its corresponding data and when processing of that captured data was completed.

In another example embodiment, the subject matter of the third example embodiment can optionally include that the timestamping logic is operable to assign timestamp information to each set of data by: obtaining a timestamp value corresponding to when said each set of data is received by the timestamp logic; and adjusting the timestamp value by compensating for a second delay between when the capture device received its corresponding sync signal and the capture device captured the set of data and a second delay from when the capture device captured the set of data to when the data is received for tagging with timestamp information by the timestamping logic.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A device comprising:
a synchronization signal generator to generate a synchronization (sync) signal for each of a plurality of heterogeneous capture devices; and
timestamping logic coupled to the synchronization signal generator to assign timestamp information to each set of data captured by individual capture devices of the plurality of capture devices to indicate when the data was captured, wherein the timestamp information is assigned based on when the sync signal is generated for its corresponding capture device and based on a first delay between when the sync signal is generated for a corresponding capture device and when processing of captured data, by a processing device, has been completed.

2. The device defined in claim 1 wherein the first delay comprises a second delay between when the captured device received the sync signal and when the capture device captured its corresponding data and a third delay between when the captured device captured its corresponding data and when processing of that captured data was completed.

3. The device defined in claim 1 wherein the timestamping logic is operable to assign timestamp information to each set of data by:
obtaining a timestamp value corresponding to when said each set of data is received by the timestamp logic; and adjusting the timestamp value by compensating for a second delay between when the capture device received its corresponding sync signal and the capture device captured the set of data and a second delay from when the capture device captured the set of data to when the data is received for tagging with timestamp information by the timestamping logic.

4. The device defined in claim 1 wherein the timestamping logic is operable to assign the timestamp information by assigning the timestamp information to a frame based on when a start of frame indicator is reported by one of the plurality of capture devices.

5. The device defined in claim 1 wherein the plurality of capture device comprises a plurality of image sensors.

6. The device defined in claim 1 wherein the timestamping logic is operable to apply timestamp information to a plurality of samples captured by one or more non-image sensors of the plurality of capture devices based on a time when a first of the plurality of samples is received by the timestamping logic after a start of frame indicator has been received.

7. The device defined in claim 6 wherein the plurality of samples captured by the one or more non-image sensors are aligned with image data captured with one or more image sensors of the plurality of capture devices based on the timestamp information.

8. The device defined in claim 1 wherein the sync signal generator is operable to generate a pair of sync signals for two of the plurality devices having different capture delays, the two sync signals being sent at different times to trigger image capture by the two capture devices at the same time.

9. The device defined in claim 1 wherein the sync signal comprises a sync pulse that is based on a master sync pulse.

10. The device defined in claim 9 wherein at least one sync pulse being generated is delay-able to control skew between capture events of at least two of the plurality of capture devices.

11. A method comprising:
generating a synchronization (sync) signal to each of a plurality of heterogeneous capture devices;
receiving data that have been captured by the plurality of capture devices and processed in response to receipt of a sync signal; and
assigning, by timestamping logic, timestamp information to each set of data captured by individual capture devices of the plurality of capture devices to indicate when the data was captured, wherein the timestamp information is assigned based on when the sync signal is generated for its corresponding capture device and based on a first delay between when the corresponding capture device received its sync signal and when processing, by a processing device, of the data captured by the capture device has been completed.

12. The method defined in claim 11 wherein the first delay comprises a second delay between when the captured device received the sync signal and when the capture device captured its corresponding set of data and a third delay between when the captured device captured its corresponding set of data and when processing of that set of captured data was completed.

13. The method defined in claim 11 wherein assigning timestamp information to each set of data comprises:
obtaining a timestamp value corresponding to when said each set of data is received by the timestamp logic; and
adjusting the timestamp value by compensating for a second delay between when the capture device received its corresponding sync signal and the capture device captured the set of data and a second delay from when the capture device captured the set of data to when the timestamping logic received the set of data.

14. The method defined in claim 11 wherein assigning the timestamp information comprises assigning the timestamp information to a frame based on when a start of frame indicator is reported by one of the plurality of capture devices.

15. The method defined in claim 11 wherein the plurality of capture device comprises a plurality of image sensors.

16. The method defined in claim 11 wherein further comprising applying timestamp information to a plurality of samples captured by one or more non-image sensors of the plurality of capture devices based on a time when a first of the plurality of samples is received by the timestamping logic after a start of frame indicator has been received.

17. The method defined in claim 16 further comprising associating the plurality of samples captured by the one or more non-image sensors with image data captured with one or more image sensors of the plurality of capture devices based on the timestamp information.

18. The method defined in claim 11 wherein generating a sync signal to each of the plurality of capture devices comprises generating a pair of sync signals for two of the plurality devices having different capture delays, the two sync signals being sent at different times to trigger image capture by the two capture devices at the same time.

19. The method defined in claim 11 further comprising aligning data based on timestamp information tagged onto the data captured by the plurality of capture devices.

20. A system comprising:
a plurality of heterogeneous capture devices;
a synchronization signal generator to generate a synchronization (sync) signal for each of the plurality of heterogeneous capture devices;
timestamping logic coupled to the synchronization signal generator to assign timestamp information to each set of data captured by individual capture devices of the plurality of capture devices to indicate when the data was captured, wherein the timestamp information is assigned based on when the sync signal is generated for its corresponding capture device and based on a first delay between when the sync signal is generated for a corresponding capture device and when processing of captured data, by a processing device, has been completed; and
a processing device to receive data with timestamp information captured from at least two of the plurality of capture devices and to align the data based on the timestamp information.

21. The system defined in claim 20 wherein the first delay comprises a second delay between when the captured device received the sync signal and when the capture device captured its corresponding data and a third delay between when the captured device captured its corresponding data and when processing of that captured data was completed.

22. The system defined in claim 20 wherein the timestamping logic is operable to assign timestamp information to each set of data by:
obtaining a timestamp value corresponding to when said each set of data is received by the timestamp logic; and
adjusting the timestamp value by compensating for a second delay between when the capture device received its corresponding sync signal and the capture device captured the set of data and a second delay from when the capture device captured the set of data to when the data is received for tagging with timestamp information by the timestamping logic.

* * * * *